United States Patent [19]

Stude

[11] 4,054,462

[45] Oct. 18, 1977

[54] METHOD OF CEMENTING

[75] Inventor: Duane L. Stude, Tulsa, Okla.

[73] Assignee: The Dow Chemical Company, Midland, Mich.

[21] Appl. No.: 768,005

[22] Filed: Feb. 11, 1977

Related U.S. Application Data

[62] Division of Ser. No. 662,666, March 1, 1976, Pat. No. 4,036,659.

[51] Int. Cl.$^2$ .............................................. C04B 7/35
[52] U.S. Cl. ..................................... 106/90; 106/110; 106/314; 106/315; 166/293
[58] Field of Search ............... 106/90, 110, 314, 315; 166/293

[56] References Cited

U.S. PATENT DOCUMENTS

| | | | |
|---|---|---|---|
| 3,615,785 | 10/1971 | Moorer et al. | 106/90 |
| 3,723,145 | 3/1973 | Haldas et al. | 106/315 |
| 3,767,463 | 10/1973 | Peppler et al. | 106/90 |

*Primary Examiner*—J. Poer
*Attorney, Agent, or Firm*—G. H. Korfhage; Bruce M. Kanuch

[57] ABSTRACT

A cement composition is provided containing portland cement; calcium sulfate hemihydrate; urea; one or more retarders selected from the group consisting of a water soluble salt of a lignosulfonic acid, a low molecular weight hydroxypolycarboxylic acid and sodium, potassium, and lithium salts thereof, and an alkaline hexametaphosphate; and as optional ingredients, calcium chloride and/or a condensation product of mononaphthalene sulfonic acid and formaldehyde; said ingredients being present in amounts effective to provide a cement which will set within a desired period of time at temperatures below about 80° F down to below freezing, e.g. 32° F, to provide a monolithic mass having adequate strength and which also has a sufficient pumping time, i.e., setting time, at higher temperatures, i.e., above about 80° F, so that it can be transported, i.e., pumped at such elevated temperatures without prematurely setting up.

17 Claims, No Drawings

METHOD OF CEMENTING

CROSS-REFERENCE TO RELATED APPLICATION

This is a division of application Ser. No. 662,666 filed Mar. 1, 1976, now U.S. Pat. No. 4,036,659 issued July 19, 1977.

BACKGROUND OF THE INVENTION

In many parts of the world, it is necessary to provide cement compositions which will flow and set in low temperature or freezing environments. For example, in parts of the world it is desired to cement casing through permafrost regions where the temperature is below 32° F. One cement system developed for these purposes is disclosed by Holmgren et al. in U.S. Pat. No. 3,179,528. That composition consists of a mixture of portland cement, gypsum, an aqueous solution of a lower aliphatic alcohol as a freeze depressant and glue size to control the pumpability time at temperatures below freezing. One drawback to this cement system is the fact that increased temperatures reduce the pumping time so that the cement must at all times be kept at low temperatures, i.e. approximately at freezing point of water and below. Because of this characteristic short pumping time at elevated temperatures, special cementing procedures and equipment must be employed in cementing, for example, borehole casing in wells which are drilled through permafrost and then into areas reaching elevated temperatures, for example, 100° F or greater. In these particular situations, a by-pass tool must be employed to prevent the freeze protected cement from entering into the higher temperature zones wherein it may set up and prevent further cementing operations on the well.

Other art which is relevant to the present invention are Federal Republic of Germany Pat. Nos. 706,404, 936,673, and 936,318; and U.S. Pat. Nos. 3,071,481 (Beach et al.) 3,582,376 (Ames), 3,782,992 (Uchikawa et al.), and 3,891,454 (Cunningham et al.). In a copending application of Duane L. Stude and Earl F. Morris, Ser. No. 438,492 filed Jan. 31, 1974, it is disclosed that compositions similar to those of Cunningham et al. can be pumped through warm zones above 80° F and thence into cooler zones, e.g. below freezing, where the compositions will set.

The present invention comprises a cement composition which, upon addition of water, forms a slurry which has the unexpected properties of increased pumpability time with increased temperatures but yet setting up at low temperatures, i.e., below 80° F to below freezing, within a suitable period of time to provide a monolithic mass having adequate compressive strength. The invention also comprises a method of cementing under such temperature conditions.

SUMMARY OF THE INVENTION

The cement composition of the present invention comprises a mixture of portland cement and gypsum in plaster of Paris form, i.e., calcium sulfate hemihydrate (hereinafter referred to simply as "gypsum"), wherein the weight ratio of portland cement to gypsum ranges from 3:1 to 1:3 portland cement-gypsum. Also included, as percent by weight of said mixture of portland cement and gypsum, is from about 5 to about 25 percent urea; from about 0.1 to about 2 percent of one or more retarders selected from the group consisting of a water-soluble salt of lignosulfonic acid, a low molecular weight hydroxypolycarboxylic acid, and sodium, potassium, and lithium salts thereof, and an alkaline (i.e. sodium or potassium) hexametaphosphate; and, as an optional dispersant, from about 0.1 to about 1.5 percent of the condensation product of mononaphthalenesulfonic acid and formaldehyde and/or the alkali metal or ammonium salt thereof. Optionally, the cement composition contains from about 0.5 to about 6 percent calcium chloride (calculated as the dihydrate) based on the weight of the portland cement-gypsum mixture. To provide a cement slurry there is added, as percent by weight of the portland cement-gypsum mixture, from about 25 to about 50 percent water.

The method of the present invention comprises emplacing the cement composition in a freezing environment, i.e. one which would cause water to freeze, and permitting the cement to set up, such as in a borehole penetrating permafrost. The method of the present invention may include the step of transporting the above described cement composition through an environment having high temperature zones, or both low and high temperature zones, and thence into the low temperature zone wherein it is desired to have the cement set yet wherein conventionally retarded cements would not set up within a suitable period of time. By suitable period of time is meant that the cement sets up before it freezes, which would reduce its strength, and that the time required for the cement to set does not result in a commercially unreasonable waiting period.

The cement compositions of the present invention can be employed in environments wherein the cement is subjected to low temperatures ranging from about 80° F and lower, even to below freezing, and to elevated temperatures of greater than about 80° F and up to as high as 300° F and higher. The exact temperature variations which can be encountered will depend on such factors as the exact cement composition, permissible pumping time and the like.

DETAILED DESCRIPTION OF THE PRESENT INVENTION

It is known in the art that the effectiveness of various chemicals, i.e., retarders, to increase the setting time of cement slurries generally decreases, i.e., the setting time decreases, as the temperature of the cement slurry increases. Conversely, as the temperature of the cement decreases the setting time generally increases sometimes to beyond acceptable periods of time. The present invention concerns the discovery of a retarded cement system, the setting time of which actually increases as the temperature of the cement increases within certain limits, but which also has the characteristic of setting within a suitable period of time at lower temperatures.

The cement composition of the present invention preferably contains a mixture of portland cement and gypsum, in plaster of Paris form, in a weight ratio ranging from about 1:1 to about 1:3 (portland cement-gypsum). Based on the weight of the above mixture there is also preferably present in said composition, from about 5 to about 15 percent urea; from about 0.3 to about 0.7 percent by weight of the above defined condensation product as a dispersant; from about 1 to about 3 percent calcium chloride (calculated as the dihydrate) which serves to further enhance the depression of the slurry freezing point, to extend the thickening time at the lower temperatures, and to improve early strengths of the set cement; from about 35 to about 45 percent by weight water; and at least one preferred retarder as described in the next paragraph.

The preferred retarders, used alone or in combination with one another, are the water soluble salts of lignosulfonic acid and lithium, sodium, or potassium citrate or tartrate. Most preferred as a retarder are the water soluble salts of lignosulfonic acid, especially the calcium salt; these particular compounds have been found to minimize water separation from the slurry. Whether used alone or in combination with one another, the preferred amount of the preferred retarder or combination of preferred retarders is defined, on a plot of the total percent of the salt(s) of lignosulfonic acid employed ("L") versus the total percent of the salt(s) of either citric or tartaric acid employed ("C"), by the area in the first quadrant bounded by and including the respective C (i.e., abscissa) and L (i.e., ordinate) axes and the lines defined by the equations $L = -2C+1$ and $L = -4C+0.4$. As above, the percents are based on the weight of the portland cement-gypsum mixture. Thus, for example, where calcium lignosulfonate is the only preferred retarder employed, it is preferably present in an amount ranging from about 0.4 to about 1 percent; conversely, where sodium citrate is the only retarder, it is preferably present in an amount ranging from about 0.1 to about 0.5 percent.

Any grade of portland cement can be employed in the practice of the present invention. The exact quantity and ratio of portland cement to gypsum in any particular composition may vary slightly depending on the type of portland cement employed and also upon the source of a particular type of cement, since small variations exist in cements obtained from different sources depending on raw materials, manufacturing procedures and the like.

Plaster of Paris form of gypsum should be employed in the practice of this invention. Plaster of Paris is also known as calcined gypsum and calcium sulfate hemihydrate.

Suitable water soluble salts of lignosulfonic acid include those selected from the group consisting of alkaline earth metal, alkali metal, and ammonium salts of lignosulfonic acid such as, for example, calcium lignosulfonate, magnesium lignosulfonate, barium lignosulfonate, sodium lignosulfonate, potassium lignosulfonate, lithium lignosulfonate, ammonium lignosulfonate, and sodium calcium lignosulfonate. The other constituents which can be used in place of or in admixture with the lignosulfonic acid salt are low molecular weight—i.e., 6 carbon atoms or less—hydroxypolycarboxylic acids and lithium, sodium, and potassium salts thereof, as well as alkaline hexametaphosphates. Illustrative of such retarders are sodium, lithium and potassium citrate or tartrate and sodium hexametaphosphate.

There is also optionally included in the composition of the invention the condensation product of mononaphthalene sulfonic acid and formaldehyde or the alkali or ammonium salt thereof (hereinafter referred to as naphthalene sulfonate product) when desired to promote proper dispersion, particularly as where a well contains fluids which may be somewhat incompatible with the basic cement composition described herein. The condensation product has the probable formula:

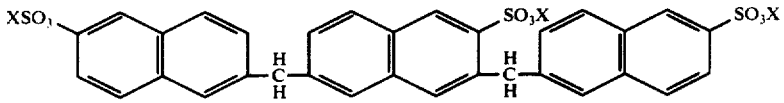

wherein X is an alkali metal or ammonium. This material is prepared by well known condensation reactions such as described by Tucker et al. in U.S. Pat. No. 2,141,569, the teachings of which are specifically incorporated herein by reference. The dispersant, also known as a densifier, may also contain additives such a polyvinylpyrrolidone, as described in U.S. Pat. No. 3,359,225.

The composition of the present invention may be employed in a novel method of cementing in freezing environments and in environments having both near freezing (e.g., 32°–45° F at about 1 atmosphere pressure) and elevated (e.g., 80°–300° F) temperature zones such as in permafrost zones and in zones underlying permafrost zones located in boreholes drilled to recover petroleum products such as gas and oil from subterranean formations. In the practice of the present invention the composition as hereinbefore defined is typically prepared at the surface and pumped down through tubing or casing through a zone which is below freezing, i.e., the permafrost zone, and then through a zone which is of a higher temperature, i.e., up to 100° F or higher, back up the annulus existing between the borehole and the tubing and into the zone which has a temperature below freezing, i.e., the permafrost zone wherein it is maintained until it has set. The cement slurry may be forced into the permafrost zone by a second cement slurry which is designed to set up in said higher temperature zone within a reasonable period of time and said second slurry is permitted to set up in said higher temperature zone.

It is necessary to prepare a composition of the invention which will maintain a sufficient pumping time to enable the composition to be pumped into place before it sets up. The required pumping time will vary depending on the depth of a well, the temperature gradient of the well and the like. The invention can be practiced anywhere that it is desired to cement in a low temperature zone, even below freezing. It will be understood, of course, that the extent of freeze protection of a particular composition of the present invention will differ somewhat from that of other variations still within the scope of the invention.

The particular pumping characteristics of any specific composition can be determined by testing samples of compositions according to such procedures as those recommended in the American Petroleum Institute Recommended Practices published under API RP-10B designations.

By employing the principles of the present invention costly and time consuming by-pass techniques and equipment can be eliminated.

Other constituents having known functional characteristics can be employed in the compositions of the present invention for their known function in hydraulic cements. These include, for example, weighing agents, loss circulation additives, such as gilsonite, graded coal, walnut shells, extenders, such as sand, fly ash, pozzolana, bentonite and the like.

EXAMPLES

In all of the following examples a Basic Cement Composition was employed containing, as percent by weight, 60 percent plaster of Paris and 40 percent portland cement (Class G). To the Basic Cement Composition were added various other constituents. Except as otherwise noted, the amount of constituent added is reported either as percent by weight of the total weight of plaster of Paris and portland cement in the composition, denoted in the Tables by "(wt/BCC)", or as percent by weight of the water employed in the slurry, denoted in the Tables by "(wt/H$_2$O)".

Various properties of samples of cement slurries were determined following the procedures set forth in the API Recommended Practice for Testing Oil-Well Cements and Cement Additives, API RP 10B, Eighteenth Edition, April, 1972. The tests were conducted following the API recommended procedures as closely as possible except for the initial temperature of the constituents employed in the cement compositions. In all the tests the initial temperature of the compositions was maintained below 80° F to obtain slurry temperatures which are typical of low temperature conditions found in areas where permafrost conditions exist. The various properties tested included thickening time, compressive strength, free water separation, packer fluid compatibility, and performance under alternating freezing and thawing conditions.

Thickening time tests were conducted with an Atmospheric Pressure Consistometer which had been modified with internal cooling coils. These coils allowed cold fluid to be circulated so as to maintain a constant low temperature. After the consistometer had been cooled to the desired temperature, the slurry was mixed and poured into a precooled slurry container. The test was then run while maintaining the desired temperature throughout the test. The test was terminated when the slurry reached 70 units of consistency (U$_c$).

Strength of various samples of set cement was determined following the API atmospheric pressure curing procedure except that the slurry, at the desired temperature, was poured into a precooled mold. After the mold was properly filled and covered, it was immediately immersed in a curing bath. If other than water was used as the curing fluid, the filled molds were placed in fluid tight plastic bags to prevent slurry contamination which could possibly produce erroneous results. A water-ethylene glycol mixture was used as the curing fluid in most of the tests.

The amount of free water which separated from slurry samples was determined following the API recommended procedures as closely as possible. The test slurries were mixed so the initial slurry temperature was the same as the test temperature. After stirring in the atmospheric pressure consistometer for the recommended 20 minutes at the test temperature, the slurries were poured into 250 ml graduated cylinders. The cylinders were then submerged in a refrigerated bath maintained at the test temperature for two hours at which time water separation readings were taken.

The compatibility of certain representative cement slurries with an oil base packer fluid was determined by running a thickening time test on the atmospheric pressure consistometer with a mixture of the particular cement slurry and the packer fluid. The packer fluid employed was prepared using a kerosene base, about 10 volume percent (based on the volume of the kerosene) of a packer fluid concentrate of the type containing tall oils and fatty acids, and, based on the weight of the kerosene and the concentrate, about 1 weight percent calcium oxide. The packer fluid was placed in a slurry cup and stirred until reaching the test temperature. The cement slurry, mixed at test temperature, was then poured on top of the packer fluid, and the thickening time to 70 U$_c$ was determined.

Freeze-thaw tests were also conducted employing an API Tentative test. The test is designed to show the effect on the set cement due to changes in temperature that may be encountered during periods of shut-down and production. The test cubes after being initially cured at 40° F for 48 hours are subjected through freeze-thaw cycles over a temperature range of 20° F to 170° F. The cubes were inspected and tested for compressive strength at regular intervals of the test which had a duration of 42 days.

Cement slurries were prepared containing the following dry ingredients in amounts proportional to those indicated:

| | |
|---|---|
| Calcium sulfate hemihydrate | 43.4 lbs |
| Class G portland cement | 28.93 lbs |
| Urea | 5.79 lbs |
| Calcium chloride dihydrate (in Tables, "CCD") | 1.45 lbs |
| Calcium lignosulfonate (in Tables, "CLS") | 0.3 to 0.5 lb. |
| Sodium naphthylene sulfonate/-formaldehyde condensation product (in Tables, "SNS") | 0.22 lb |
| Nominal | 80 lb sack |

Hereinafter, "Preferred Dry Formulation" refers to the above mixture when 0.5 lb of the calcium lignosulfonate is employed per sack.

The slurries shown in Table I below were prepared by admixing the Preferred Dry Formulation with various amounts of water.

Table I—Properties of Slurries from Preferred Dry Formulation

TABLE I

| Properties of Slurries from Preferred Dry Formulation | | |
|---|---|---|
| Water gallons/sack | Slurry Yield ft$^3$/sack | Slurry Weight lbs/sack |
| 3.91 | 1.01 | 14.9 |
| 3.47 | 0.96 | 15.3 |
| 3.21 | 0.92 | 15.5 |
| 3.04 | 0.90 | 15.7 |

Hereinafter, "Preferred Slurry" refers to the slurry prepared using 3.21 gallons of water per sack of Preferred Dry Formulation.

The effect of temperature on the compressive strength of cured samples of the Preferred Slurry was evaluated and the results are tabulated in Table II:

TABLE II

| Effect of Temperature on Compressive Strength of Preferred Slurry | | | | | | |
|---|---|---|---|---|---|---|
| | Psi at | | | | | |
| Temp.° F | 16 hrs | 24 hrs | 3 days | 7 days | 14 days | 28 days |
| 20 | 925 | 950 | 1334 | 1325 | 1600 | 1788 |
| 40 | 760 | 785 | 1366 | 1468 | 1675 | 1825 |
| 60 | 725 | 750 | 1365 | Not run | 2006 | Not run |
| 80 | 790 | 810 | 1440 | Not run | 2098 | Not run |

Tests were conducted at various temperatures to determine the effect of the concentration of calcium lignosulfonate retarder on the thickening times (to 70

$U_c$) of samples of slurries similar in all other respects to the Preferred Slurry. The results are shown in Table III.

TABLE III

Effect of Various Concentrations of CLS on Thickening Time

| %CLS(wt/BCC) | Time to 70 $U_c$ | | | |
|---|---|---|---|---|
| | 30° F | 40° F | 50° F | 60° F |
| 0.4 | Not run | 2:10 | Not run | Not run |
| 0.5 | 4:10 | 3:45 | 3:20 | 3:00 |
| 0.6 | Not run | 4:30 | Not run | Not run |

Set samples from slurries substantially identical to those described in the preceding paragraph were tested for compressive strength after 16 hours at 20° F and at 40° F. The results are shown in Table IV.

TABLE IV

Effect of Various Concentrations of CLS on Compressive Strength

| % CLS (wt/BCC) | PSI in 16 hours | |
|---|---|---|
| | 20° F | 40° F |
| 0.4 | 995 | 856 |
| 0.5 | 925 | 760 |
| 0.6 | 856 | 660 |

Tests were run to determine the compressive strength of various samples obtained from slurries having differing slurry densities, prepared by adjusting the amount of water used with the Preferred Dry Formulation as reported in Table I. The results are shown in Table V.

TABLE V

Effect of Various Amounts of Water on Compressive Strength of Preferred Dry Fromulation

| Slurry Wt. lbs/gal | PSI at 20° F | | | PSI at 40° F | | |
|---|---|---|---|---|---|---|
| | 8 hrs | 16 hrs | 3 days | 8 hrs | 16 hrs | 3 days |
| 15.3 | 262 | 635 | 912 | 560 | 583 | 1178 |
| 15.5 | 608 | 925 | 1334 | 704 | 760 | 1366 |
| 15.7 | 708 | 953 | Not run | 752 | 905 | Not run |

To the Preferred Dry Formulation was added 5 or 10 pounds, respectively, of ground coal and 3.41 gallons of water. The compressive strength of samples of these various slurries cured for different lengths of times at different temperatures is set forth in Table VI. Average analysis of the coal employed was, by weight: carbon, 83.2%; hydrogen, 4.95%; nitrogen, 1.6%; oxygen, 3.95%; sulfur, 0.6%; and ash, 5-8%. Cumulative particle size distribution of the coal, as determined by screen analysis, U.S. Sieve Series, was: retained on ⅛-inch mesh, 0 weight percent; on 14 mesh, 38.55%; on 28 mesh, 62.80%; on 48 mesh, 76.42%; on 100 mesh, 86.38%; and on 200 mesh, 92.05%.

TABLE VI

A. Compressive Strength of Preferred Dry Formulation, 5 lbs coal, and 3.41 Gallons of Water (slurry yield, 1 cu. ft. per sack; density, 15.1 lbs/gal)

| Temp., ° F | PSI | | |
|---|---|---|---|
| | 16 hrs | 24 hrs | 3 days |
| 20 | 310 | 360 | 1005 |
| 40 | 425 | 445 | 1130 |
| 60 | 670 | 765 | 1170 |
| 80 | 703 | 740 | 1250 |

B. Compressive Strength of Preferred Dry Formulation, 10 lbs Coal, and 3.41 Gallons of Water (Slurry yield, 1.09 cu. ft. per sack; density, 14.6 lbs/gal)

| Temp., ° F | PSI | | |
|---|---|---|---|
| | 16 hrs | 24 hrs | 3 days |
| 20 | 625 | 630 | 850 |
| 40 | 562 | 663 | 980 |
| 60 | 620 | 725 | 1080 |
| 80 | 680 | 803 | 1175 |

The compatibility of the Preferred Slurry with an oil base packer fluid was determined by mixing various amounts of the cement slurry and the packer fluid as hereinabove described and thereafter determining the thickening time of the mixture at 40° F. The results are shown in Table VII.

TABLE VII

Compatibility of Preferred Slurry with Oil Base Packer Fluid

| Composition of Mixture (% by Volume) | | Time to 70 $U_c$ (40° F) |
|---|---|---|
| Cement Slurry | Packer Fluid | hours:minutes |
| 0 | 100 | 6:30* |
| 20 | 80 | 4:50* |
| 50 | 50 | 4:15 |
| 80 | 20 | 3:30 |
| 100 | 0 | 3:45 |

*70 $U_c$ had not yet been attained when test was discontinued at time indicated.

Samples of the Preferred Slurry were cured and subjected to the Freeze-Thaw Tests defined above. Average results were:
After 2 days curing at 40° F = 1042 psi
After 1 cycle (14 days) = 1700 psi, cubes sound
After 3 cycles (42 days) = 3389 psi, cubes sound.

In the following tests the Basic Cement Composition (60 pbw plaster of Paris, 40 pbw Class G portland cement) was mixed with various other constituents in the amounts shown in the following Tables. Various tests were conducted on the samples as noted in the heading of each Table. The constituents, the type of test and the results are set forth in the following Tables VIII through XV.

TABLE VIII

Thickening Time and Compressive Strength Tests[1]

| % Urea (wt/H₂O) | % NaCl (wt/H₂O) | % CLS (wt/BCC) | % SNS (wt/BCC) | % Water (wt/BCC | Thickening Time,40° F,70 $U_c$ | Compressive Strength PSI at 16 hours | | |
|---|---|---|---|---|---|---|---|---|
| | | | | | | 40° F | 25° F | 20° F |
| 10 | 5 | 0.5 | 0.3 | 40 | 5:25 | 661 | — | 545[2] |
| 10 | 5 | 0.3 | 0.3 | 40 | 2:29 | — | — | — |
| 10 | 5 | 0.3 | 0 | 40 | 2:18 | — | — | — |
| 15 | 5 | 0.5 | 0.3 | 40 | 6:00 | 541 | — | 634 |
| 15 | 5 | 0.3 | 0 | 40 | — | 658 | — | 688 |
| 20 | 0 | 0.3 | 0 | 40 | 2:53 | 619 | 650 | (2) |
| 20 | 0 | 0.5 | 0 | 40 | — | 600 | — | 285[2] |
| 20 | 5 | 0.4 | 0.3 | 38 | 2:40 | 589 | — | 725 |
| 20 | 5 | 0.5 | 0.3 | 37 | 3:45 | 669 | — | 662 |

TABLE VIII-continued

Thickening Time and Compressive Strength Tests[1]

| % Urea (wt/H$_2$O) | % NaCl (wt/H$_2$O) | % CLS (wt/BCC) | % SNS (wt/BCC) | % Water (wt/BCC) | Thickening Time, 40° F, 70 U$_c$ | Compressive Strength PSI at 16 hours 40° F | 25° F | 20° F |
|---|---|---|---|---|---|---|---|---|
| 25 | 0 | 0.3 | 0 | 40 | 2:51 | 765 | 519 | 362[3] |
| 25 | 0 | 0.4 | 0.3 | 40 | 4:27 | 784 | — | 888 |
| 25 | 0 | 0.4 | 0.3 | 35 | 4:07 | — | — | — |
| 25 | 5 | 0.4 | 0.3 | 36.5 | 3:12 | — | — | — |
| 25 | 5 | 0.5 | 0.3 | 36.5 | 4:11 | 659 | — | 780 |
| 25 | 5 | 0.5 | 0.3 | 34 | — | 910 | — | 1040 |
| 30 | 0 | 0.3 | 0 | 40 | 2:40 | 621 | 615 | 650 |
| 30 | 0 | 0.3 | 0.4 | 34 | 2:23 | — | — | — |
| 30 | 0 | 0.4 | 0.3 | 34 | 2:47 | — | — | — |
| 30 | 0 | 0.4 | 0.4 | 34 | 2:58 | — | — | — |
| 30 | 0 | 0.5 | 0 | 37 | 5:07 | 645 | — | 818 |
| 30 | 0 | 0.5 | 0.4 | 34 | 3:30 | — | — | — |
| 30 | 0 | 0.5 | 0.4 | 36.5 | 4:11 | — | — | — |
| 30 | 0 | 0.5 | 0.4 | 37 | 4:55 | 649 | — | 790 |
| 30 | 0 | 0.5 | 0 | 37[4] | 4:25 | 686 | — | 807 |
| 30 | 0 | 0.5 | 0.4 | 37[4] | 5:38 | 760 | — | 925 |

Notes
[1] Blanks in table indicate the test was not run.
[2] Frozen.
[3] Partially frozen.
[4] Slurry also contained 2% (wt/BCC) CaCl$_2$. 2H$_2$O.

TABLE IX

Free Water Determination Tests

| % Urea (wt/H$_2$O) | % NaCl (wt/H$_2$O) | % CLS (wt/BCC) | % SNS (wt/BCC) | % Water (wt/BCC) | Free Water (ml.) |
|---|---|---|---|---|---|
| 15 | 5 | 0.5 | 0.3 | 40 | 1 |
| 15 | 5 | 0.5 | 0 | 40 | Nil |
| 20 | 0 | 0.5 | 0.3 | 40 | 1.5 |
| 20 | 5 | 0.5 | 0 | 40 | 1 |
| 20 | 5 | 0.5 | 0.3 | 40 | 1 |
| 20 | 5 | 0.5 | 0.3 | 38 | .5 |
| 20 | 5 | 0.5 | 0.3 | 37 | Nil |
| 25 | 0 | 0.4 | 0.3 | 40 | 1 |
| 25 | 0 | 0.4 | 0.3 | 35 | Nil |
| 30 | 0 | 0.4 | 0.3 | 40 | 1.5 |
| 30 | 0 | 0.4 | 0.3 | 34 | Nil |

TABLE X

Oil Based Packer Fluid Compatibility Tests

| % Urea (wt/H$_2$O) | % CLS (wt/BCC) | % SNS (wt/BCC) | % Water (wt/BCC) | 70 U$_c$ Thickening Time at 40° F | Volume Ratio Cement:Packer |
|---|---|---|---|---|---|
| 25 | 0.4 | 0.3 | 36.5 | 4:27 | cement only |
| 25 | 0.4 | 0.3 | 36.5 | 4:21 | 1:1 |
| 25 | 0.4 | 0.3 | 35.0 | 4:07 | cement only |
| 25 | 0.4 | 0.3 | 35.0 | 4:30 | 1:1 |
| 25 | 0.3 | 0.3 | 34.0 | 3:40 | 1:1 |
| 30 | 0.4 | 0.3 | 34.0 | 4:40 | cement only |
| 30 | 0.4 | 0.3 | 34.0 | 4:40 | 1:1 |

TABLE XI

Compressive Strengths at 15° F

| % Urea (wt/H$_2$O) | % NaCl (wt/H$_2$O) | % CLS (wt/BCC) | % SNS (wt/BCC) | % Water (wt/BCC) | Compressive Strength psi at 16 hrs, 15° F |
|---|---|---|---|---|---|
| 20 | 5 | 0.5 | 0.3 | 38 | 361 (frozen)[1] |
| 25 | 0 | 0.4 | 0.3 | 34 | Frozen[2] |
| 30 | 0 | 0.4 | 0.3 | 34 | 670 (slightly frozen)[2] |
| 30 | 3 | 0.4 | 0.3 | 34 | 1000 (not frozen) |
| 30 | 5 | 0.4 | 0.3 | 34 | 786 (not frozen) |

[1] Compare Table VIII where a substantially identical composition (except containing 37% water) did not freeze at 25° F.
[2] Similarly, though strength tests were not run at higher but still sub-freezing temperatures using the compositions in the second and third runs shown in this table, data for only slightly different compositions reported in Table VIII indicate these compositions would be satisfactory at slightly higher temperatures, e.g. about 20–25° F and above.

TABLE XII

Effect of Various Retarders on System Containing 30% Urea (wt/H$_2$O) and 37% Water (wt/BCC)

| Retarder (wt/BCC) | Thickening Time 70 U$_c$ 40° F | Compressive Strength PSI in 16 hours 20° F | 40° F |
|---|---|---|---|
| None[1] | 0:20 | 1175 | 1064 |
| 0.5% CLS | 5:07 | 818 | 645 |
| 0.3% Sodium Citrate | 8:00[2] | 585 | 601 |
| 0.2% Citric Acid | 7:50 | 20 | 59 |
| 0.3% Sodium Hexamataphosphate | 0:55 | —[3] | —[3] |

TABLE XII-continued

Effect of Various Retarders on System Containing 30% Urea (wt/H₂O) and 37% Water (wt/BCC)

| Retarder (wt/BCC) | Thickening Time 70 U_c 40° F | Compressive Strength PSI in 16 hours | |
|---|---|---|---|
| | | 20° F | 40° F |
| 0.5% Sodium Hexamataphosphate | 1:15 | 994 | 974 |

[1] This run is a comparison run outside the scope of the invention showing that if no retarder is employed, the composition has an unacceptably short thickening time.
[2] 70 U_c had not yet been attained when test was discontinued after 8 hours.
[3] Not Run.

Tables XIII through XV illustrate that elevated temperatures actually extend rather than reduce the thickening time of the present compositions.

TABLE XIII

Effect of Elevated Temperature on Thickening Time at Atmospheric Pressure

| % Urea (wt/H₂O) | % Water (wt/BCC) | % CaCl₂·2H₂O (wt/BCC) | % SNS (wt/BCC) | % Retarder (wt/BCC) | Atmosphereic Pressure Thickening Times, 70 U_c | |
|---|---|---|---|---|---|---|
| | | | | | 40° F | See Note (1) |
| 21.7 | 37 | 2 | 0.3 | 0.5% CLS | 3:45 | 6:50 |
| 30 | 37 | 0 | 0.3 | 0.5% CLS | 4:20 | 8:20 |
| 21.7 | 37 | 0 | 0.3 | 0.5% CLS | 3:15 | 7:15 |
| 21.7 | 37 | 2 | 0.3 | 0.2% Sodium Citrate | 3:56 | 6:08 |
| 30 | 37 | 0 | 0.3 | 0.2% Sodium Citrate | 3:40 | 4:43 |
| 21.7 | 37 | 2 | 0.3 | 0.2% Citric Acid | 5:10 | 5:28 |

Note:
(1) Temperatures as a function of time were maintained as follows:

| Time Hrs:Min | Temperature ° F |
|---|---|
| 0 | 50 |
| 0:10 | 55 |
| 0:20 | 75 |
| 0:30 | 95 |
| 0:40 | 110 |
| 0:50 | 130 |
| 1:00 | 140 |
| 1:30 | 140 |
| 2:00 | 140 |
| 3:00 | 140 |
| 3:10 | 135 |
| 3:20 | 128 |
| 3:30 | 120 |
| 3:40 | 116 |
| 3:50 | 112 |
| 4:00 | 100 |
| 4:15 | 93 |
| 4:30 | 83 |
| 4:45 | 68 |
| 5:00 and thereafter | 50 |

TABLE XIV

Effect of Elevated Temperatures and Pressures on Thickening Time of Representative Slurry[1]

| Schedule[2] | BHCT.° F[3] | Thickening Time to 100 U_c |
|---|---|---|
| 6 | 144 | 12:00[4] |
| 7 | 172 | 12:00[4] |
| 8 | 206 | 7:48 |
| 9 | 248 | 10:00[4] |

[1] Containing 37% water (wt/BCC), 21.7% Urea (wt/H₂O), 2% (wt/BCC) calcium chloride, 0.3% SNS (wt/BCC), and 0.5% CLS.
[2] API RP 10B, 18th Edition, April 1972.
[3] Bottom hole circulating temperature.
[4] 100 U_c had not been attained when test discontinued after time indicated.

TABLE XV

Effect of Elevated Temperatures on Compressive Strength of Representative Slurry[1,2]

| Temperature ° F | Compressive Strength, PSI | | |
|---|---|---|---|
| | 16 hrs | 24 hrs | 48 hrs |
| 40 | 760 | NR[3] | NR |
| 50 | 610 | NR | NR |
| 80 | 575 | NR | NR |
| 100 | 450 | NR | NR |
| 120 | NS[4] | NS | 675 |

[1] For composition of slurry see Note (1), Table XIV.
[2] Slurries were initially stirred for one hour at 140° F, poured into test molds, and then maintained at the temperatures, and for the times, indicated.
[3] NR denotes no test was run.
[4] NS denotes slurry not set.

Data reported in Tables XVI through XVIII were obtained using a Class G portland cement obtained from a different commercial supplier than the Class G portland cement used in the runs hereinabove reported.

TABLE XVI

Thickening Time Tests

| % Urea (wt/H₂O) | % NaCl (wt/H₂O) | % CLS (wt/BCC) | % SNS (wt/BCC) | % Water (wt/BCC) | Time to 70 U_c |
|---|---|---|---|---|---|
| 30 | 0 | 0.4 | 0.3 | 36.5 | 3:03 |
| 30 | 0 | 0.4 | 0.3 | 34.0 | 2:37 |
| 25 | 5 | 0.4 | 0.3 | 36.5 | 3:25 |
| 25 | 5 | 0.5 | 0.3 | 36.5 | 5:02 |
| 25 | 5 | 0.4 | 0.3 | 34.0 | 3:16 |

TABLE XVII

Compressive Strength Tests (0.5% CLS (wt/BCC), 0.3% SNS (wt/BCC), 36.5% Water (wt/BCC))

| Curing Temp. | 30% Urea (wt/H$_2$O), psi at | | | | 25% Urea (wt/H$_2$O), 5% NaCl (wt/H$_2$O) psi at | | | |
|---|---|---|---|---|---|---|---|---|
| | 16 hrs | 3 days | 14 days | 28 days | 16 hrs | 3 days | 14 days | 28 dyas |
| 20 | 735 | 793 | 1443 | 1841 | 794 | 770 | 1122 | 1500 |
| 40 | 616 | 794 | 1600 | 2042 | 705 | 762 | 1377 | 1840 |
| 60 | Not run | 920 | Not run | 2378 | Not run | 940 | not run | 1786 |
| 80 | Not run | 950 | Not run | 2121 | Not run | 859 | not run | 2029 |

TABLE XVIII

| System: | 30% Urea (wt/H$_2$O) | 0.4% CLS (wt/BCC), |
|---|---|---|
| | 0.3% SNS (wt/BCC), | 34% Water (wt/BCC) |

Results:

After 2 days curing at 40° F = 1020 psi
After 1 cycle (14 days) = 2810 psi, cubes sound
After 3 cycles (42 days) = 3700 psi, cubes sound
except for small amount of spalling at very top.

What is claimed is:

1. A method of cementing in the low temperature zone of an environment having a low temperature zone below about 80° F, which comprises:
   1. providing a slurry comprising portland cement and the calcium sulfate hemihydrate form of gypsum in a weight ratio of from 3:1 to 1:3 and, based on the total weight of said portland cement and gypsum,
      a. from about 5 to about 25 percent urea,
      b. from about 0.1 to about 2 percent of at least one retarder selected from the group consisting of
         i. a water soluble salt of lignosulfonic acid,
         ii. a low molecular weight hydroxypolycarboxylic acid,
         iii. a sodium, potassium, or lithium salt of a low molecular weight hydroxypolycarboxylic acid, and
         iv. an alkaline hexametaphosphate, and
      c. from about 25 to about 50 percent water;
   2. transporting said slurry to said low temperture zone; and
   3. permitting the slurry to set up in said low temperature zone.

2. The method of claim 1, including providing in the slurry, from about 0.5 to about 6 percent calcium chloride, calculated as the dihydrate, based on the weight of the portland cement and gypsum.

3. The method of claim 1, wherein from about 35 to about 45 percent water is provided in the slurry, based on the weight of the portland cement and gypsum.

4. The method of claim 1 wherein the environment is a borehole penetrating the low temperature zone to be cemented.

5. The method of claim 1 wherein the environment also has a high temperature zone of at least about 80° F and the slurry is transported through said high temperature zone before it is permitted to set up in said low temperature zone.

6. The method of claim 5 wherein the environment is a borehole extending through a permafrost zone sufficiently deeply so that the borehole has a high temperature zone as defined in claim 36, comprising pumping the slurry through the permafrost zone into the high temperature zone, and then back into the permafrost zone before permitting the slurry to set up in said permafrost zone.

7. The method of claim 1 wherein from about 5 to about 15 percent urea is provided in the slurry, based on the weight of the portland cement and gypsum.

8. The method of claim 7 wherein from about 35 to about 45 percent water is provided in the slurry, based on the weight of the portland cement and gypsum.

9. The method of claim 8 wherein the environment is a borehole penetrating the low temperature zone to be cemented.

10. The method of claim 8 wherein the environment also has a high temperature zone of at least about 80° F and the slurry is transported through said high temperature zone before it is permitted to set up in said low temperature zone.

11. The method of claim 10 wherein the environment is a borehole extending through a permafrost zone sufficiently deeply so that the borehole has a high temperature zone as defined in claim 41, comprising pumping the slurry through the permafrost zone into the high temperature zone, and then back into the permafrost zone before permitting the slurry to set up in said permafrost zone.

12. The method of claim 1, including providing in the slurry, from about 0.1 to about 5 percent of a dispersant, based on the weight of the portland cement and gypsum, said dispersant comprising a condensation product of mononaphthalenesulfonic acid and formaldehyde, one or more alkali metal or ammonium salt derivatives thereof, or mixtures of said condensation product and any of its recited derivatives.

13. The method of claim 12, including providing in the slurry, from about 0.5 to about 6 percent calcium chloride, calculated as the dihydrate, based on the weight of the portland cement and gypsum.

14. The method of claim 13 wherein the portland cement is a Class G portland cement and the weight ratio of portland cement to gypsum is 1:1 to 1:3, and wherein the following components are provided in the slurry in the amount specified, based on the total weight of the portland cement and gypsum: urea about 5 to about 15 percent; calcium chloride, expressed as the dihydrate, about 1 to about 3 percent; said dispersant, about 0.3 to about 0.7 percent; water, about 35 to about 45 percent; and calcium lignosulfonate, about 0.4 to about 1 percent.

15. The method of claim 14 wherein the environment is a borehole penetrating the low temperature zone to be cemented.

16. The method of claim 14 wherein the environment also has a high temperature zone of at least about 80° F and the slurry is transported through said high temperature zone before it is permitted to set up in said low temperature zone.

17. The method of claim 16 wherein the environment is a borehole extending through a permafrost zone sufficiently deeply so that the borehole has a high temperature zone as defined in claim 47, comprising pumping the slurry through the permafrost zone into the high temperature zone, and then back into the permafrost zone before permitting the slurry to set up in said permafrost zone.

* * * * *